United States Patent
Armstrong

(10) Patent No.: US 9,912,369 B1
(45) Date of Patent: Mar. 6, 2018

(54) METHODS AND APPARATUS FOR ADAPTIVELY MAINTAINING A COMMUNICATIONS LINK DURING IDLE MODE

(71) Applicant: Altera Corporation, San Jose, CA (US)

(72) Inventor: Michael James Armstrong, Los Altos, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/962,390

(22) Filed: Dec. 8, 2015

(51) Int. Cl.
*H04B 1/40* (2015.01)
*H04L 12/751* (2013.01)

(52) U.S. Cl.
CPC ............. *H04B 1/40* (2013.01); *H04L 45/026* (2013.01)

(58) Field of Classification Search
CPC ...... H04B 1/38; H04B 1/3822; H04B 1/3827; H04B 1/3888; H04B 1/40; H04B 1/401; H04B 1/48; H04B 1/50; H04B 1/52; H04B 1/54; H04B 1/58; H04L 7/00; H04L 7/0008; H04L 7/0054; H04L 45/026
USPC ....... 375/219, 220, 222, 224, 259, 354–356, 375/371; 370/350, 503; 455/500–503, 455/88, 553.1
See application file for complete search history.

(56) References Cited

U.S. PATENT DOCUMENTS

| | | | |
|---|---|---|---|
| 5,960,036 A | * | 9/1999 | Johnson .................. H04L 5/023 370/278 |
| 6,212,175 B1 | | 4/2001 | Harsch |
| 8,077,657 B2 | | 12/2011 | Venkatachalam et al. |
| 8,411,628 B2 | | 4/2013 | Eronen |
| 9,036,525 B2 | | 5/2015 | Choi |
| 2003/0128676 A1 | | 7/2003 | Lee |
| 2011/0263214 A1 | * | 10/2011 | Robinson ............... H04B 1/006 455/88 |
| 2012/0170496 A1 | | 7/2012 | Yang et al. |
| 2014/0225560 A1 | * | 8/2014 | Walley ................ H01M 2/0267 320/108 |
| 2014/0226548 A1 | | 8/2014 | Son et al. |
| 2015/0349869 A1 | * | 12/2015 | Sun .......................... H04B 7/08 455/132 |

* cited by examiner

*Primary Examiner* — Young T Tse

(57) ABSTRACT

An integrated circuit for adaptively maintaining a communications link during an idle mode is disclosed. The integrated circuit may operate in a first (active) mode and a second (idle) mode. The integrated circuit includes a transceiver circuit that establishes a communications link with an additional transceiver circuit of an external integrated circuit. The transceiver circuit may receive data packets from the additional transceiver circuit during the first mode. The integrated circuit further includes monitoring circuitry that monitors a health metric associated with maintaining the communications link between the transceiver circuit and the additional transceiver circuit during the second mode. A control circuit may generate keep-alive signals and adaptively adjusts the frequency of the keep-alive signals such that the health metric is satisfied.

18 Claims, 6 Drawing Sheets

METHODS AND APPARATUS FOR ADAPTIVELY MAINTAINING A COMMUNICATIONS LINK DURING IDLE MODE

BACKGROUND

A Serializer/Deserializer (SerDes) is a pair of functional blocks commonly used in high speed communications. These blocks convert data between serial data and parallel interfaces in each direction. The generic SerDes has two functions, the Parallel-to-Serial converter, sometimes called the Parallel-In Serial-Out (PISO) block, and the Serial-to-Parallel converter, sometimes called the Serial-In Parallel-Out (SIPO) block. The SIPO block has a serial clock and data inputs. The serial clock may have been recovered from the data stream using a clock recovery technique. The SIPO block then divides the incoming serial clock down to the parallel rate.

Typically, one or more SerDes blocks of an integrated circuit device may send occasional bursts of control signals (or keep-alive signals) at a fixed frequency to another integrated circuit device to ensure that the communications link between both integrated circuit devices is established and ready at all times. However, there is a concern that the SerDes blocks run continuously (i.e., at all times) regardless of whether there is a data signal to be sent between the two integrated circuit devices. This may result in increased power consumption and may inadvertently degrade performance and reliability of the integrated circuit device.

SUMMARY

In accordance with the present invention, apparatuses and methods are provided for adaptively maintaining a communications link during an idle mode.

It is appreciated that the present invention can be implemented in numerous ways, such as a process, an apparatus, a system, or a device. Several inventive embodiments of the present invention are described below.

An integrated circuit operable in first and second modes is disclosed. The integrated circuit includes a transceiver circuit that receives data packets from an external integrated circuit die during the first (active) mode. The integrated circuit further includes monitoring circuitry that monitors a metric associated with maintaining the communications link between the integrated circuit and the external circuit die during the second (idle) mode. In this mode, a control circuit may output keep-alive packets and may adaptively adjust the frequency at which the keep-alive packets are output based on the monitored metric associated with maintaining the communications link.

A circuit system is disclosed. The circuit system includes a first integrated circuit and a second integrated circuit that forms a communications link with the first integrated circuit. The second integrated circuit may monitor a health metric of the communications link. The second integrated circuit may generate control signals to maintain the communications link between the first integrated circuit and the second integrated circuit during an idle mode. Based on a function of the health metric of the communications link, the second integrated circuit may adjust a frequency of the control signals.

A method of operating an integrated circuit is disclosed. The method includes using a control circuit on the integrated circuit to determine whether a metric associated with maintaining a communications link between the integrated circuit and an external integrated circuit satisfies a predetermined threshold during an idle mode. The control circuit may generate keep-alive signals, and may adaptively adjusts a frequency of the keep-alive signals in response to determining whether the metric associated with maintaining the communications link between the integrated circuit and the external integrated circuit satisfies the predetermined threshold during the idle mode.

Further features of the invention, its nature and various advantages, will be more apparent from the accompanying drawings and the following detailed description of the preferred embodiments.

DETAILED DESCRIPTION

The embodiments provided herein include an integrated circuit and methods for adaptively maintaining a communications link during an idle mode.

It will be obvious, however, to one skilled in the art, that the present exemplary embodiments may be practiced without some or all of these specific details. In other instances, well-known operations have not been described in detail in order not to obscure unnecessarily the present embodiments.

Figure 1:
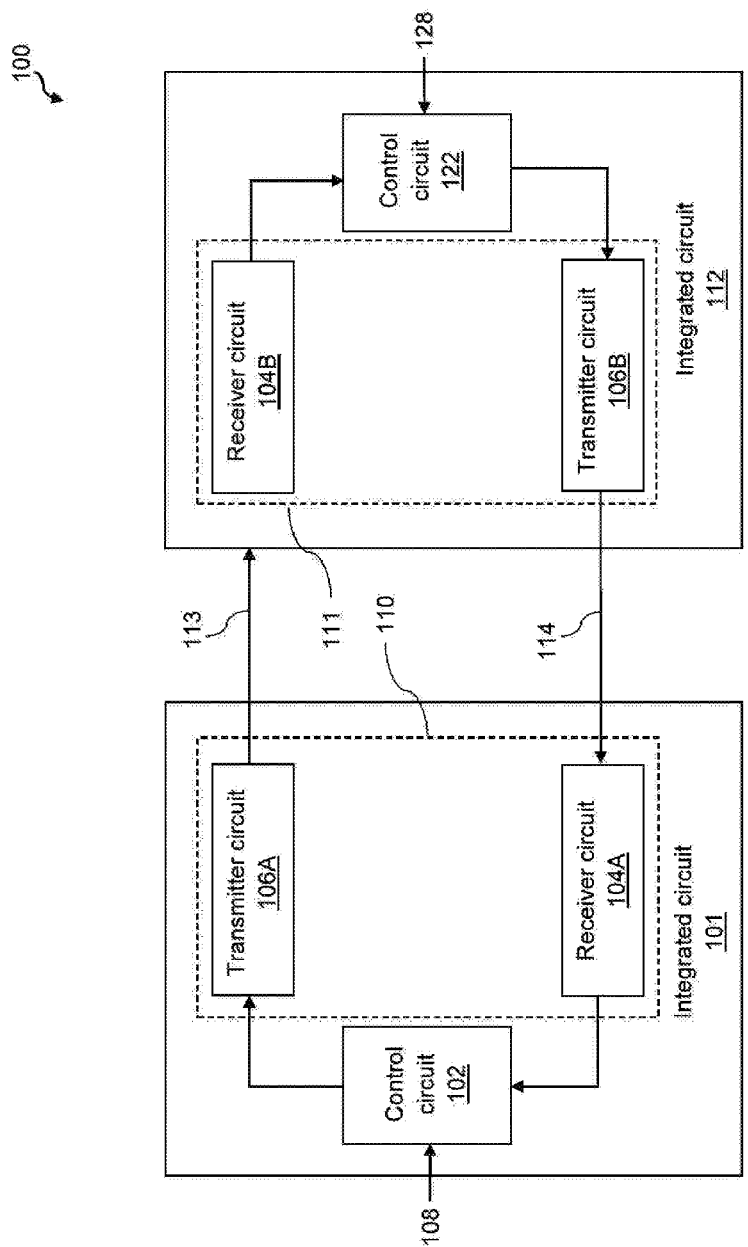
FIG. 1 shows a block diagram of an illustrative circuit system, in accordance with an embodiment of the present invention.

FIG. 1 shows a block diagram of circuit system 100, in accordance with an embodiment of the present invention. System 100 includes integrated circuit 101 and integrated circuit 112. Each integrated circuit includes a receiver circuit and a transmitter circuit, which may form part of serializer/deserializer (SERDES) circuitry. For example, receiver circuit 104A and transmitter circuit 106A may form part of SERDES circuitry 110 in integrated circuit 101, and receiver circuit 104B and transmitter circuit 106B may form part of SERDES circuitry 111 in integrated circuit 112. SERDES circuitry 110 of integrated circuit 101 may communicate with SERDES circuitry 111 of integrated circuit 112 in system 100 through communications links 113 and 114. For example, communications links 113 and 114 may be any suitable communications link suitable for communicating data between integrated circuits 101 and 112 such as fiber optic links, copper links, radio links or the like.

During an active state (i.e., data transport mode), receiver circuit 104A of integrated circuit 101 may receive data packets 128 (via communication links 114) from a transmitter circuit (e.g., transmitter circuit 106B) of integrated circuit 112. As an example, data packets 128 may be input/output (IO) signals being transmitted out from other parts of integrated circuit 112. Similarly, receiver circuit 104B of integrated circuit 111 may receive data signals 108 (via communication links 113) from transmitter circuit 106A of integrated circuit 101. As an example, data signals 106 may be IO signals being transmitted out from other parts of integrated circuit 101.

However, when no data packets are being transmitted from any of transmitter circuits 106A and 106B, the corresponding receiver circuits are said to be in an idle state. For example, receiver circuit 104A is in the idle state when no data packets are being received from transmitter circuit 106B of integrated circuit 112. In this scenario, transmitter circuit 106B of integrated circuit 112 may transmit or send adaptive control signals (also referred to as keep-alive signals, keep-alive packets or keep-alive bursts herein), which are generated from control circuit 122, to receiver circuit 104A through communications link 114.

Similarly, receiver circuit 104B is in an idle state when no data packets are being received from transmitter circuit 106A of integrated circuit 101. In this scenario, transmitter circuit 106A of integrated circuit 101 may transmit or send the keep-alive signals which are output from control circuit 102 to receiver circuit 104B through communications link 113. In one embodiment, the keep-alive signals are only generated during the idle mode and are used to maintain the communications between SERDES circuitries 110 and 111 in the respective integrated circuit 101 and integrated circuit 112 so that they are maintained and ready at all times. As an example, the keep-alive signals may include coded commands and data that are required to maintain the communications between the transmitter circuits and their corresponding receiver circuits in each integrated circuit.

In order to monitor power consumption of SERDES circuitries 110 and 111 during signal transmission, an adaptive burst control mechanism may be implemented in integrated circuits 101 and 112. The adaptive burst control mechanism may monitor a metric associated with maintaining the communications link between the two integrated circuits and adaptively control (or adjust) the frequency at which the keep-alive signals are output based on the monitored metric to ensure that the SERDES circuitry 110 in integrated circuit 101 and SERDES circuitry 111 in integrated circuit 112 is ready for communication at all times with minimal power consumption.

For example, the adaptive burst control mechanism in integrated circuit 101 may employ the use of SERDES circuitry 110 and control circuit 102 for this purpose. Similarly, the adaptive burst control mechanism in integrated circuit 112 may employ the use of SERDES circuitry 111 and control circuit 122 for this purpose. A more detailed description of the adaptive burst control mechanism will be described below with reference to FIG. 2.

Figure 2:
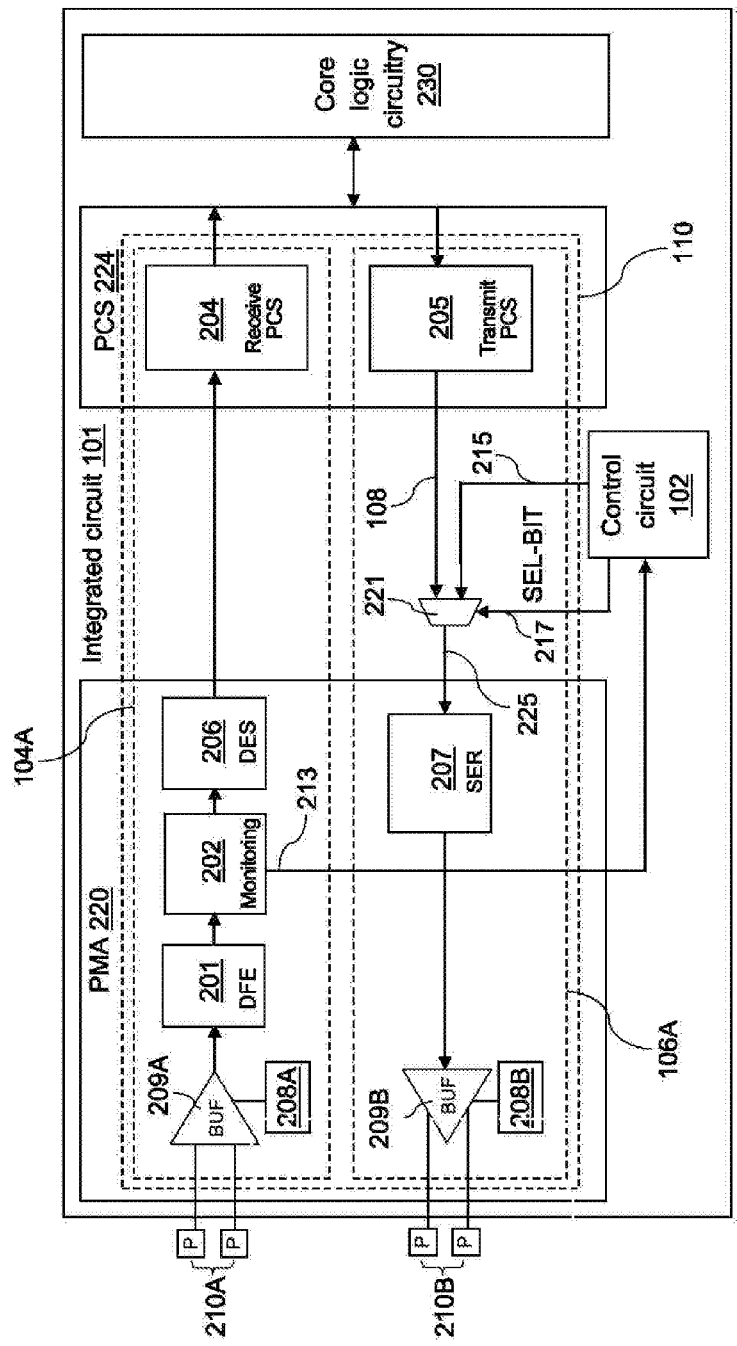
FIG. 2 is a circuit diagram of an illustrative integrated circuit in a circuit system, in accordance with an embodiment of the present invention.

FIG. 2 is a circuit diagram of integrated circuit 101 in circuit system 100 of FIG. 1, in accordance with an embodiment of the present invention. As shown in FIG. 2, integrated circuit 101 may include SERDES circuitry 110 and core logic circuitry 230. Core logic circuitry 230 may include, for example, the general-purpose, programmable logic circuitry of integrated circuit 101. SERDES circuitry 110 is typically used to send and/or receive one or more high-speed serial data signals from either core logic circuitry 230 of integrated circuit 101 or other circuitries (e.g., integrated circuit 112 of FIG. 1). As shown in FIG. 2, SERDES circuitry 110 may include receiver circuit 104A and transmitter circuit 106A (collectively referred to as a transceiver circuit). The configuration of receiver circuit 104A and transmitter circuit 106A can be identical or similar to receiver and transmitter circuits of conventional transceivers and, for brevity purposes, will not be described in detail herein. The components of SERDES circuitry 110 (e.g., input pins 210A, receiver input buffer 209A, receiver phase-locked loop (PLL) 208A, decision-feedback equalizer (DFE) 201, monitoring circuitry 202, deserializer circuitry 206, output pins 210B, transmitter output buffer 209B, transmitter PLL 208A, and serializer circuitry 207) may reside on one or more printed circuit boards, as is commonly done for the components of many conventional transceivers.

SERDES circuitry 110 may include physical coding sublayer (PCS) circuitry (e.g., PCS circuitry 224) and physical medium attachment (PMA) circuitry (e.g., PMA circuitry 220). PCS circuitry 224 generally provides digital logic functions which implement data communication protocols (or portions thereof), while the PMA circuitry 220 generally provides mixed (analog/digital) signal functionality for data communications. For example, PMA circuitry 220 may be configured to perform, among other operations, serialization of data to be transmitted (conversion from parallel to serial), and de-serialization of received data (conversion from serial to parallel). For certain protocols, PCS circuitry 224 may be configured to perform, among other functions, bit encoding for data signals to be sent to PMA circuitry 220 (e.g., using transmitter PCS portion 205), and bit decoding for data signals received from PMA circuitry 220 (e.g., using receiver PCS portion 204). PCS circuitry 224 may be arranged into channels, where each channel may process data for a stream of data signals.

During a data transport mode (or active state), a receiver circuit from one integrated circuit may receive input data signals from a transmitter circuit from another integrated circuit. For example, receiver circuit 104A of integrated circuit 101 may receive input data signals from transmitter circuit 106B of integrated circuit 112 of FIG. 1 via input pins 210A. In this scenario, monitoring circuitry 202 in PMA circuitry 220 may extract a clock signal from the input data signals and may provide a recovered clock signal that samples the input data signals and clocks deserializer circuit 206. For example, monitoring circuitry 202 may be a clock and data recovery (CDR) circuit.

In the case when the receiver circuit receives no data signals from the transmitter circuit, the receiver circuit is said to be in an idle state (or idle mode). For example, assume that receiver circuit 104B of integrated circuit 112 of FIG. 1 receives no data signals from transmitter circuit 106A of integrated circuit 101. Instead, receiver circuit 104B may receive bursts of adaptive control signals (sometimes referred to herein as "keep-alive" signals 215) across communications link 113. In one embodiment, control circuit 102 of integrated circuit 101 outputs keep-alive signals 215 during the idle mode. Control circuit 102 may also output an asserted SEL-BIT signal 217 to multiplexer circuit 221 to selectively pass through keep-alive signals 215 instead of passing through data signals 108 during the idle mode. As an example, keep-alive signals 215 may include coded commands and data that are required to maintain the communications link between receiver circuit 104B and transmitter circuit 106A.

In order to increase power-savings during the idle mode, an adaptive burst control mechanism may be implemented in integrated circuit 101. In one embodiment, the adaptive burst control mechanism may include monitoring circuitry 202 and control circuit 102. Monitoring circuitry 202 may monitor a health metric associated with maintaining the communications link between integrated circuit 101 and integrated circuit 112. Control circuit 102 may adaptively adjust the frequency at which the keep-alive signals are output based on a function of the health metric obtained from monitoring circuitry 202. Operation of the adaptive burst control mechanism in accordance with the preferred embodiment may be explained below.

During the idle mode, monitoring circuitry 202 may sample an incoming signal (that is applied to input pins 210A) from integrated circuit 112 through across communications link 114 to recover a clock output frequency (or phase). In one embodiment, the incoming signal may include control commands that are generated by control circuit 122 of integrated circuit 112 to indicate the quality of keep-alive signals 215 that are sent by transmitter circuit 106A of integrated circuit 101 to receiver circuit 104B of integrated circuit 112 across communications link 113. Based on the recovered clock output frequency, monitoring circuitry 202 may provide an indicator signal (e.g., indicator signal 213) to control circuit 102 to determine a health metric (e.g., "Good," "Marginal," "Loss of Lock", etc.) associated with maintaining the communications link between receiver circuit 104B and transmitter circuit 106A during the idle mode. In one embodiment, the health metric of the communications link may refer to the strength of monitoring circuitry 202 locking to the incoming signal.

For the purpose of power-savings, control circuit 102 may receive and compare indicator signal 213 with a predetermined health metric threshold (e.g., half of the frequency of the recovered clock output). For example, if indicator signal 213 is less than (i.e., falling below) the predetermined metric threshold (i.e., "Loss of Lock" status), control circuit 102 may increase the frequency of keep-alive signals 215 until the predetermined metric threshold is satisfied. In another example, if indicator signal 215 exceeds (i.e., rising above) the predetermined metric threshold (i.e., "Good" status), control circuit 102 may reduce the frequency of keep-alive signals 215, as long as receiver circuit 104B receives a sufficient amount of keep-alive signals 215 from transmitter circuit 106B to maintain the communications link. In yet another example, if indicator signal 215 meets the predetermined metric threshold (i.e., "Marginal" status), control circuit 102 will maintain the frequency of keep-alive signals 215 to a predetermined frequency (e.g., the frequency of the recovered clock).

Figure 3:
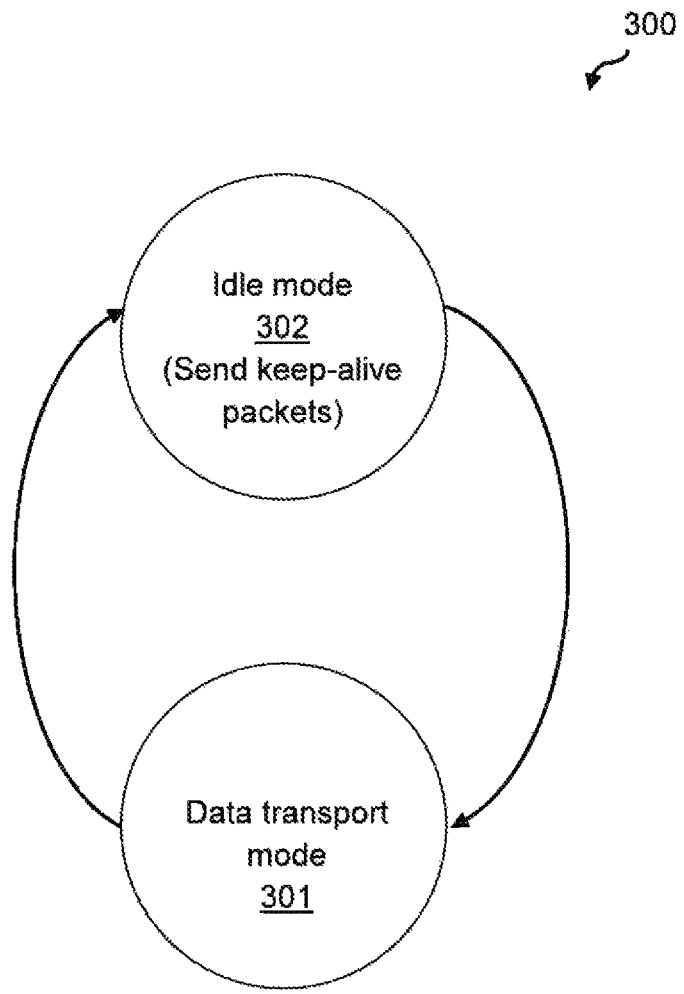
FIG. 3 is an illustrative state diagram showing the operational modes of an integrated circuit, in accordance with an embodiment of the present invention.

FIG. 3 is an illustrative state diagram 300 showing the operational modes of integrated circuit 101 of FIGS. 1 and 2, in accordance with an embodiment of the present invention. It should be appreciated that the embodiment of FIGS. 1 and 2 may be used as examples to illustrate the process described below.

In data transport mode 301, receiver circuit 104B in SERDES circuitry 111 of integrated circuit 112 may receive incoming data signals from transmitter circuit 106A in SERDES circuitry 110 of integrated circuit 101 via communications link 113. In idle mode 302, receiver circuit 104B receives no data signals from transmitter circuit 106A. To ensure that receiver circuit 104B maintains a communications link with transmitter circuit 106A during idle mode 302, receiver circuit 104B may receive keep-alive signals (e.g., keep-alive signals 215 of FIG. 2) from transmitter circuit 106A. In one embodiment, the keep-alive signals are adaptive control signals that are output from control circuit 102 of integrated circuit 101. The keep-alive signals may include coded commands and data that are required to maintain the communications between receiver circuit 104B and transmitter circuit 106A.

During idle mode 302, control circuit 102 may adaptively control the frequency at which the keep-alive signals are output to save power. To do so, monitoring circuitry 202 may monitor a health metric associated with maintaining the communications link between integrated circuit 101 and integrated circuit 112 and generate an indicator signal (e.g., indicator signal 213). For example, the health metric may include control commands that are generated by control circuit 122 of integrated circuit 112 to indicate how strongly receiver circuit 104B locks to the received keep alive signals during idle mode 302. Accordingly, control circuit 102 may receive and compare indicator signal 213 with a predetermined metric threshold. Based on the comparison result, control circuit 102 may adjust (e.g., increase, decrease or maintain) the frequency of the keep-alive signals. This ensures that the communications link between the two integrated circuits is maintained and ready at all times while consuming a minimal amount of power.

Figure 4:
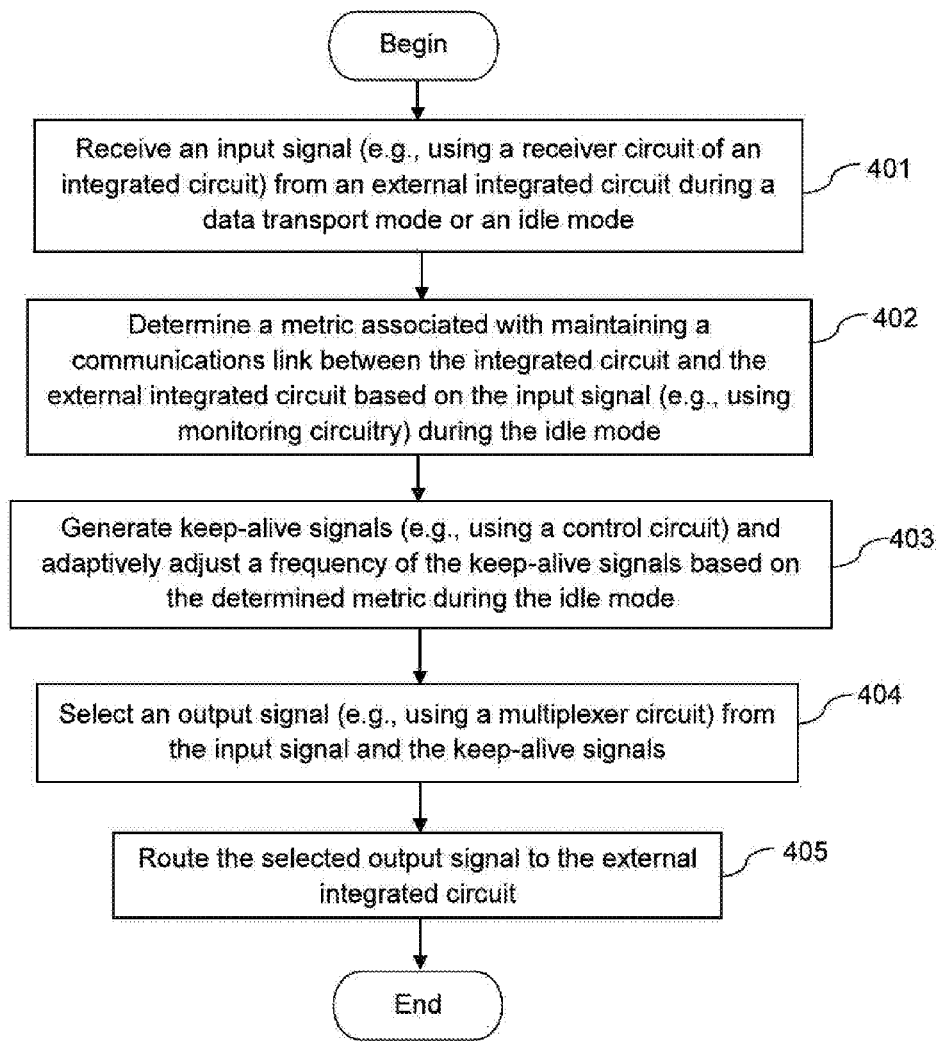
FIG. 4 is an illustrative method for adaptively maintaining a communication link between two integrated circuits, in accordance with an embodiment of the present invention.

FIG. 4 is an illustrative method for adaptively maintaining a communication link between two integrated circuits, in accordance with an embodiment of the present invention. It should be appreciated that the embodiment of FIGS. 1 and 2 may be used as examples to illustrate the steps described below. At step 401, an integrated circuit may receive an input signal is received from an external integrated circuit during a data transport mode or an idle mode, using a receiver circuit of the integrated circuit. For example, the integrated circuit may receive data signals from the external integrated circuit during the data transport mode.

At step 402, a health metric associated with maintaining the communications link between the integrated circuit and the external integrated circuit is determined based on the input signal using monitoring circuitry, during the idle mode. For example, as shown in FIG. 2, monitoring circuitry 202 may sample an incoming signal (that is applied to input pins 210A) from integrated circuit 112 to recover a clock output frequency (or phase). Based on the recovered clock output frequency (or phase), monitoring circuitry 202 may provide an indicator signal (e.g., indicator signal 213) that determines a health metric (e.g., strength of monitoring circuitry 202 locking to the incoming signal) associated with the communications link between integrated circuit 101 and integrated circuit 112. Control circuit 102 may receive and compare the indicator signal with a predetermined health metric threshold.

At step 403, a control circuit coupled to the monitoring circuitry may generate bursts of keep-alive signals (e.g., keep-alive signals 215 of FIG. 2), and may adaptively adjust the frequency at which the keep-alive signals are generated based on a function of the health metric during the idle mode. For example, if indicator signal 213 indicates that the health metric is less than the predetermined health metric threshold, control circuit 102 will increase the frequency of the generated keep-alive signals to be sent across the communications link. In another example, if indicator signal 213 indicates that the health metric is greater than the health metric threshold, control circuit 102 will decrease the frequency of the generated keep-alive signals to be sent across the communications link. In yet another example, if indicator signal 213 meets the predetermined health metric threshold, control circuit 102 will maintain the frequency of the keep-alive signals to a predetermined frequency (e.g., the frequency of the recovered clock).

At step 404, an output signal is selected from the input signal and the keep-alive signals using a multiplexer circuit. As an example, as shown in FIG. 2, control circuit 102 may control multiplexer circuit 221 (e.g., using SEL-BIT signal 217) to select keep-alive signals 215 instead of data signals 108 during the idle mode. At step 405, the selected output signal is routed to the external integrated circuit. As an example, as shown in FIG. 2, the selected output signal is serialized (using serializer circuit 207) and routed to integrated circuit 112 via differential serial output pins 210B to maintain communication with integrated circuit 112.

Figure 5:
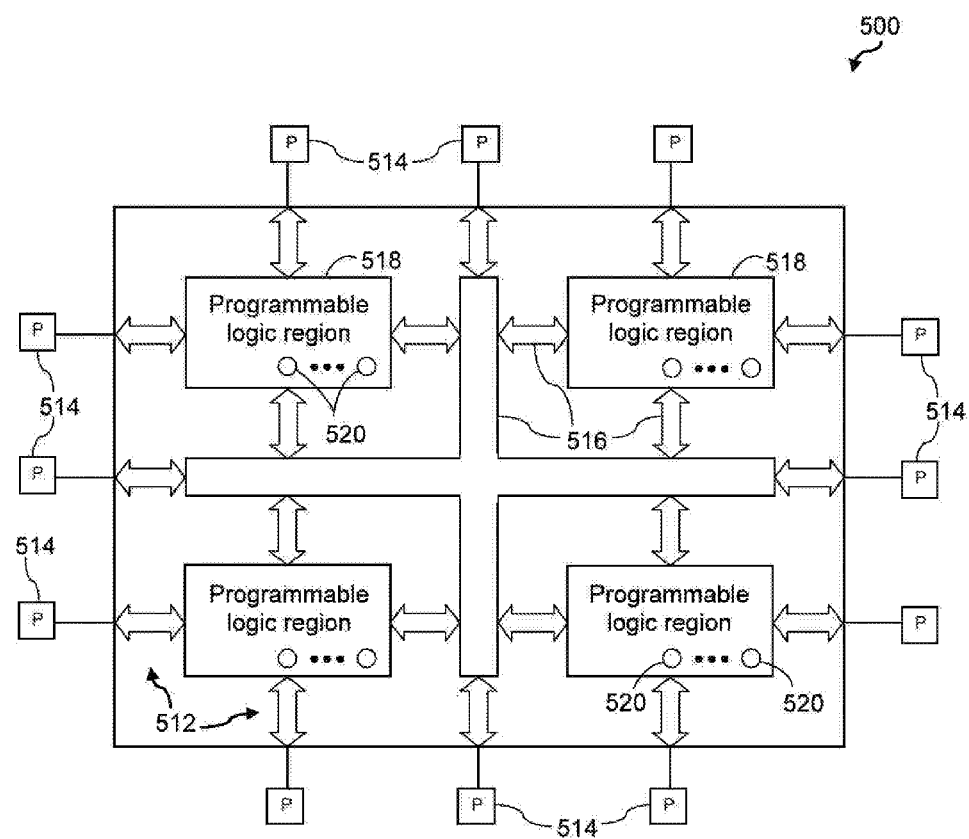
FIG. 5 is a diagram of an illustrative programmable integrated circuit, in accordance with an embodiment of the present invention.

FIG. 5 shows an illustrative integrated circuit 500 that can include aspects of the present invention. It should be understood that embodiments of the present invention can be made in numerous types of integrated circuits such as field programmable gate arrays (FPGAs), programmable logic devices (PLDs), complex programmable logic devices (CPLDs), programmable logic arrays (PLAs), application specific integrated circuits (ASICs), memory integrated circuits, central processing units, microprocessors, analog integrated circuits, etc.

As shown, integrated circuit 500 has input-output (IO) circuitry 512 for driving signals off of integrated circuit 500 and for receiving signals from other circuits or devices via IO pins 514. Interconnection resources 516 such as global and local vertical and horizontal conductive lines and busses may be used to route signals on integrated circuit 500. Interconnection resources 516 include fixed interconnects (conductive lines) and programmable interconnects (e.g., programmable connections between respective fixed interconnects). The programmable interconnects associated with interconnection resources 516 may be considered to be a part of programmable logic regions 518.

Memory elements 520 may be formed using complementary metal-oxide-semiconductor (CMOS) integrated circuit technology (as an example). In the context of programmable logic device, memory elements 520 may store configuration data and are therefore sometimes referred to as configuration random-access memory (CRAM) cells. In general, configuration random-access memory elements 520 may be arranged in an array pattern. In a programmable logic device, there may be millions of memory elements 520 on a single device. A user (e.g., a logic designer) may provide configuration data for the array of memory elements during programming operation. Once loaded with configuration data, memory elements 520 may selectively control (e.g., turn on and off) portions of the circuitry in programmable logic regions 518 and thereby customize its functions as desired.

The circuitry of integrated circuit 500 may be organized using any suitable architecture. For example, programmable logic regions 518 may be organized in a series of rows and columns of larger programmable logic regions, each of which contains multiple smaller regions. The larger regions are sometimes referred to as logic array blocks. The smaller logic regions are sometimes referred to as logic elements. A typical logic element may contain a look-up table, registers, and programmable multiplexers. If desired, programmable logic regions 518 may be arranged in more levels or layers in which multiple large regions are interconnected to form still larger portions of logic.

Horizontal and vertical conductors and associated control circuitry may be used to access memory elements 520 when memory elements 520 are arranged in an array. The control circuitry, for example, may be used to clear all or some of the memory elements. The control circuitry may also write data to memory elements 520 and read data from memory elements 520. Memory elements 520 may be loaded with configuration data, for instance, in CRAM arrays. The loaded configuration data may then be read out from the memory array to confirm proper data capture before integrated circuit 500 is used during normal operation in a system.

Figure 6:
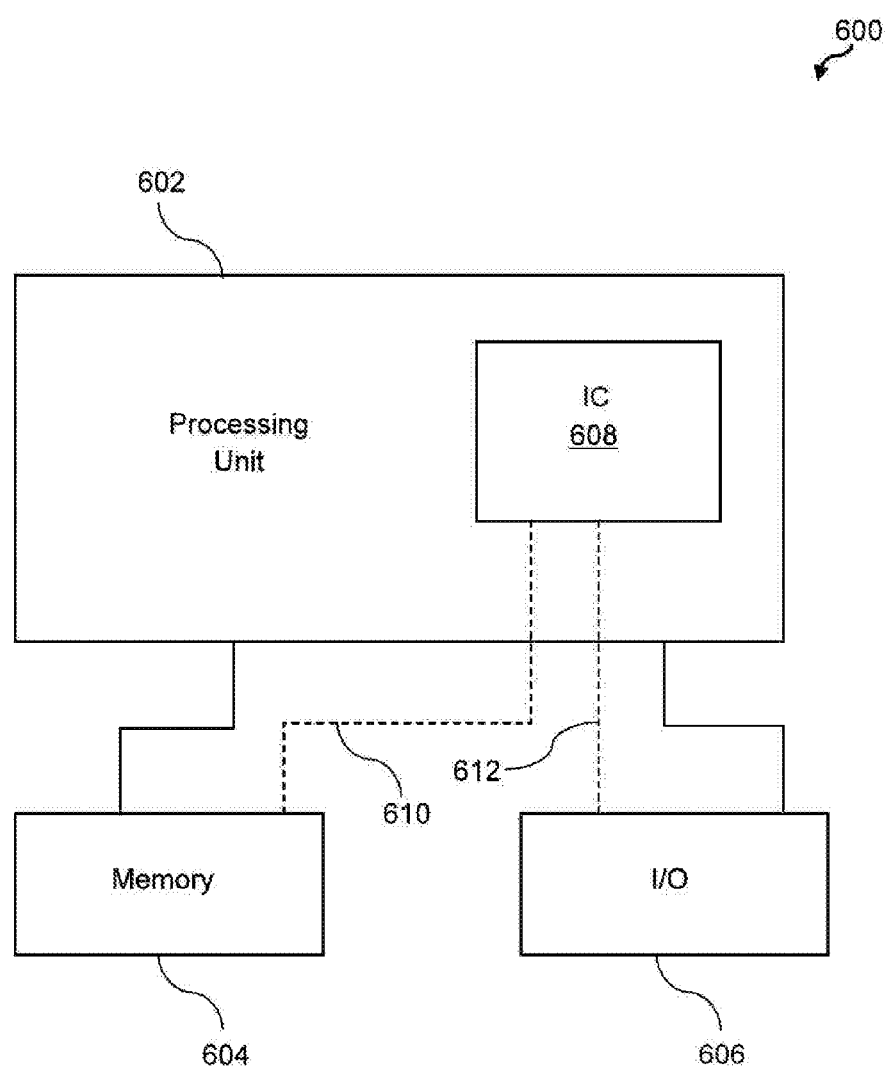
FIG. 6 is a block diagram of an illustrative digital system, in accordance with an embodiment of the present invention.

The present invention can also be implemented in a system that has an integrated circuit as one of several components. FIG. 6 shows a block diagram of an exemplary digital system 600 that can embody techniques of the present invention. System 600 can be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 600 can be provided on a single board, on multiple boards, or within multiple enclosures.

System 600 includes a processing unit 602, a memory unit 604, and an input/output (I/O) unit 606 interconnected together by one or more buses. According to this exemplary embodiment, an integrated circuit 608 is embedded in processing unit 602. Integrated circuit 608 can serve many different purposes within the system of FIG. 6. Integrated circuit 608 can, for example, be a logical building block of processing unit 602, supporting its internal and external operations. Integrated circuit 608 is programmed to implement the logical functions necessary to carry on its particular role in system operation. Integrated circuit 608 can be specially coupled to memory 604 through connection 610 and to I/O unit 606 through connection 612.

Processing unit 602 can direct data to an appropriate system component for processing or storage, execute a program stored in memory 604, receive and transmit data via I/O unit 606, or other similar functions. Processing unit 602 can be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more integrated circuit 608 can control the logical operations of the system. As another example, integrated circuit 608 acts as a reconfigurable processor that can be reprogrammed as needed to handle a particular computing task. Alternatively, integrated circuit 608 can itself include an embedded microprocessor. Memory unit 604 can be a random access memory (RAM), read only memory (ROM), fixed or flexible disk media, flash memory, tape, or any other storage means, or any combination of these storage means.

The foregoing description of the exemplary embodiments of the present invention has been presented for the purposes of illustration and description. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. An integrated circuit operable in first and second modes, comprising:
    a transceiver circuit that receives data packets from an external integrated circuit during the first mode, wherein the transceiver circuit includes monitoring circuitry that monitors a metric associated with maintaining a communications link between the integrated circuit and the external integrated circuit during the second mode; and a control circuit that outputs keep-alive packets and adaptively adjusts a frequency at which the keep-alive packets are output based on the monitored metric associated with maintaining the communications link.

2. The integrated circuit of claim 1, wherein the first mode is a data transport mode, and wherein the second mode is an idle mode.

3. The integrated circuit of claim 1, wherein the transceiver circuit further comprises:
a multiplexer circuit that receives the data packets and the keep-alive packets, wherein the multiplexer circuit is controlled by the control circuit to selectively output a selected one of the data packets and the keep-alive packets.

4. The integrated circuit of claim 1, wherein the monitoring circuitry generates an indicator signal that indicates a health status of the communications link based on the metric associated with maintaining the communications link.

5. The integrated circuit of claim 4, wherein the control circuit performs a comparison between the metric associated with maintaining the communications link and a predetermined metric threshold.

6. The integrated circuit of claim 5, wherein the control circuit increases the frequency at which the keep-alive packets are output when the metric of the communications link is below the predetermined metric threshold.

7. The integrated circuit of claim 5, wherein the control circuit decreases the frequency at which the keep-alive packets are output when the metric of the communications link is above the predetermined metric threshold.

8. The integrated circuit of claim 1, wherein the transceiver circuit receives the keep-alive packets during the second mode.

9. A circuit system comprising:
a first integrated circuit; and
a second integrated circuit that forms a communications link with the first integrated circuit, wherein the second integrated circuit comprises monitoring circuitry configured to monitor a health metric of the communications link and a control circuit configured to generate control signals to maintain the communications link between the first integrated circuit and the second integrated circuit during an idle mode, and wherein the control circuit adjusts a frequency of the control signals as a function of the health metric of the communications link.

10. The circuit system of claim 9, wherein the monitoring circuitry generates an indicator signal that represents the health metric of the communications link.

11. The circuit system of claim 10, wherein the control circuit compares the indicator signal with a predetermined metric threshold.

12. The circuit system of claim 11, wherein the control circuit increases the frequency of the control signals when the indicator signal is less than the predetermined metric threshold.

13. The circuit system of claim 11, wherein the control circuit decreases the frequency of the control signals when the indicator signal exceeds the predetermined metric threshold.

14. A method of operating an integrated circuit, comprising:
with monitoring circuitry on the integrated circuit, monitoring whether a metric associated with maintaining a communications link between the integrated circuit and an external integrated circuit satisfies a predetermined threshold during an idle mode; and
with a control circuit on the integrated circuit, generating keep-alive signals and adaptively adjusting a frequency of the keep-alive signals in response to monitoring whether the metric associated with maintaining the communications link between the integrated circuit and the external integrated circuit satisfies the predetermined threshold during the idle mode.

15. The method of claim 14, further comprises:
with the monitoring circuitry coupled to the control circuit, monitoring the metric by receiving an incoming data signal from the external integrated circuit and sampling the incoming data signal.

16. The method of claim 15, wherein monitoring the metric further comprising:
with the monitoring circuitry, generating an indicator signal corresponding to the metric.

17. The method of claim 16, further comprising:
with the control circuit, increasing the frequency of keep-alive signals in response to detecting that the indicator signal is less than the predetermined threshold.

18. The method of claim 16, further comprising:
with the control circuit, decreasing the frequency of the keep-alive signals in response to detecting that the indicator signal exceeds the predetermined threshold.

* * * * *